US006229660B1

(12) United States Patent
Chung (10) Patent No.: US 6,229,660 B1
(45) Date of Patent: May 8, 2001

(54) METHOD AND APPARATUS FOR READING INFORMATION RECORDING FIELD OF HARD DISK DRIVE TO ENABLE RELIABLE ADJUSTMENT OF AUTOMATIC GAIN CONTROL AND PHASE-LOCKED LOOP

(75) Inventor: Ji-Hwan Chung, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/122,652

(22) Filed: Jul. 27, 1998

(30) Foreign Application Priority Data

Jul. 25, 1997 (KR) .................................................. 97-34918

(51) Int. Cl.[7] ...................................................... G11B 5/09
(52) U.S. Cl. ............................................. 360/51; 360/53

(58) Field of Search ......................................... 360/53, 51

(56) References Cited

U.S. PATENT DOCUMENTS 5,557,482 * 9/1996 Christensen ........................ 360/53
5,642,244    6/1997 Okada et al. .

* cited by examiner

Primary Examiner—Alan T. Faber
(74) Attorney, Agent, or Firm—Robert E. Bushnell, Esq.

(57) ABSTRACT

A technique for reading an information recording field in an information recording disk of a hard disk drive determines whether a read error is generated during a reading of the information recording field. A read gate signal generating timing is adjusted to be different from a normal timing if a read error is generated, and then the information recording field is re-read on the basis of the adjusted read gate signal generating timing.

8 Claims, 6 Drawing Sheets

METHOD AND APPARATUS FOR READING INFORMATION RECORDING FIELD OF HARD DISK DRIVE TO ENABLE RELIABLE ADJUSTMENT OF AUTOMATIC GAIN CONTROL AND PHASE-LOCKED LOOP

CLAIM OR PRIORITY

This application makes reference to, incorporates the same herein, and claims all benefits accruing under 35 U.S.C. §119 from an application for *METHOD FOR READING INFORMATION RECORDING FIELD IN INFORMATION RECORDING DISK OF HARD DISK DRIVE* earlier filed in the Korean Industrial Property Office on the 25$^{th}$ of July 1997 and there duly assigned Ser. No. 34918/1997.

BACKGROUND OF THE INVENTION

1. Field of the Invention

The present invention relates to a hard disk drive (HDD), and in particular, to a technique for reading an information storing sector on each track of an information recording magnetic disk.

2. Description of the Related Art

A hard disk drive has, for example, two disks and four heads, each head corresponding to one surface of the disks. For reading a preamplifier preamplifies a signal picked up by one of the heads and supplies an analog read signal to a read/write channel circuit while for writing, the preamplifier supplies a write current representative of encoded write data received from the read/write channel circuit to a corresponding head to thereby write the write data on the disk. The read/write channel circuit detects data pulses from the read signal received from the preamplifier and decodes the detected data pulses and supplies them to a disk data controller, or decodes the write data received from the disk data controller and supplies the decoded write data to the preamplifier.

The disk data controller includes a sequencer for implementing an operation according to a program downloaded from a microcontroller and writes data received from a host computer on the disk via the read/write channel circuit and the preamplifier, or reads data from the disk via the preamplifier and the read/write channel circuit and sends the read data to the host computer. The disk data controller also interfaces communication between the host computer and the microcontroller, and temporarily stores data transmitted between the host computer and the microcontroller and between the host computer and the read/write channel circuit.

The microcontroller controls the disk data controller in response to a read/write command received from the host computer and the read/write channel circuit. The microcontroller controls the disk data controller in response to a read or write command received from the host computer and also controls track seek and track following. A read only memory stores operation programs and various designated values of the microcontroller. The microcontroller supplies a control value for controlling rotation of the disks to the spindle motor driver to thereby drive the spindle motor driver and rotate the disks. A disk signal controller generates various timing signals needed for reading and writing under the control of the microcontroller, decodes servo information, and supplies the decoded servo information to the microcontroller.

On a hard disk having a constant density recording data format, a complete data sector and a split data sector are disposed between servo fields in a track.

Generally, an information recording area of a CDR disk is split into a plurality of zones having uniform recording densities and disposed radially from the center of the disk. The tracks in each split zone have different data sectors. That is, a track located in an outer circumferential zone has more data sectors than that in an inner circumferential zone. A data sector is a unit area for accessing data on a disk by a magnetic disk recording device, and has the same size, for example, 512 bytes, regardless of positions on the disk. In an embedded sector servo, which is one of the schemes for providing head position information to the magnetic disk recording device, one data sector can be split into two segements depending on zones on the disk, and servo information areas and data areas are alternately arranged along the circumferential direction in each track. A servo information area is a servo field for recording servo information, and a data area is used for recording actual data and provides a data sector.

Each data sector is divided into an identification field and a data field. Header information for identifying a corresponding data sector is recorded in the identification field and actual digital data is recorded in the data field following the identification field.

The data field is composed of a VFO (variable frequency oscillator) being a data preamble, a sync pattern being a data address mark, actual data, ECC (error correction code), and PAD being a data postamble. The data preamble VFO is disposed between a postamble of the identification field and a sync pattern and is a synchronization signal for clock synchronization when reading the data field. The sync pattern provides synchronization necessary for reading the data with the magnetic disk recording device by notifying as to the start of the data. The data is digital data actually stored on the disk. The error correction code is an error detection code for detecting and correcting errors in the data address mark and the data. The postamble PAD provides a timing margin needed after reading the data.

When sector pulses are generated in a sector pulse generating circuit of the hard disk drive, a sequencer of the disk data controller senses the sector pulses, detects the starting position of a data sector, and sets a read gate signal to a high level so as to start reading the data field.

However, the abovenoted read operation has a problem as follows. The read gate signal is generated at a predetermined time, determined according to a microprogram, after the sector pulses are generated. Then, an automatic gain control level and phase of a phase locked loop circuit are simultaneously adjusted according to a detected VFO signal. The automatic gain control and phase locked loop are completely adjusted by the time the sync pattern is detected. An automatic gain control circuit, provided in the read/write channel circuit, automatically controls the gain of a signal preamplified in the preamplifier, amplifies the gain controlled signal, and outputs the amplified signal. There is no problem when the VFO signal is normal in amplitude and waveshape. On the other hand, the VFO signal may be defective at a rising edge of a read gate signal or the VFO signal may be inaccurately written due to jitter of the spindle motor during writing. With defects in the VFO signal, the automatic gain control level and the phase locked loop phase are not properly adjusted.

The patent to Okada et al., U.S. Pat. No. 5,642,244, entitled *Method And Apparatus For Switching Between Data And Servo Modes*, discloses features in common with the present invention but does not teach or suggest the specifically recited technique for reading an information recording field in accordance with the present invention.

SUMMARY OF THE INVENTION

Therefore, the object of the present invention is to provide a technique for reading an information recording field so as to enable reliable adjustment of an AGC level and a PLL, phase even with defects in a VFO signal.

To achieve the above object, there is provided a method for reading an information recording field on an information recording disk of a hard disk drive. In the information recording field reading method, it is determined whether a read error has been generated during a reading of the information recording field. A read gate signal generating timing is adjusted to be different from a normal timing if a read error has been generated, and then the information recording field is re-read using the adjusted read gate signal generating timing.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail with reference to the attached drawings.

Figure 1:
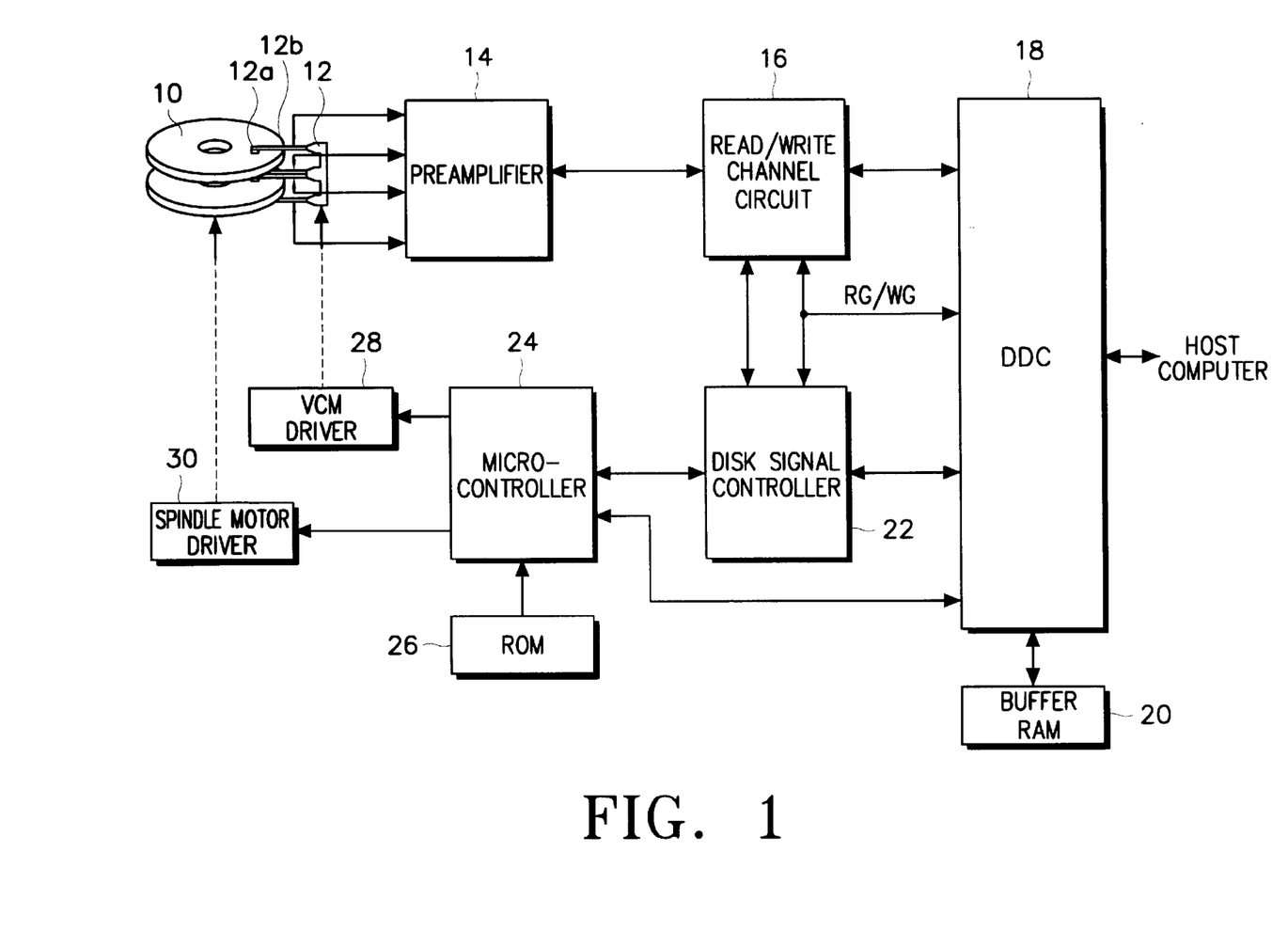
FIG. 1 is a schematic block diagram of a hard disk drive.

FIG. 1 is a schematic block diagram of an HDD having, for example, two disks 10 and four heads, 12a each head corresponding to one surface of the disks 10. Referring to FIG. 1, the disks 10 are rotated by a spindle motor driver 30. Support arms 12b correspondingly extend toward the disks 10 from an E-block assembly 12 connected to a VCM (Voice Coil Motor) driver 28. For reading, a preamplifier 14 preamplifies a signal picked up by one of the heads 12a and supplies an analog read signal to a read/write channel circuit 16. For writing, the preamplifier 14 supplies a write current representative of encoded write data received from the read/write channel circuit 16 to a corresponding head 12a to thereby write the write data on the disk 10. The read/write channel circuit 16 detects data pulses from the read signal received from the preamplifier 14, decodes the detected data pulses, supplies the decoded data pulses to a DDC (Disk Data Controller) 18, decodes the write data received from the DDC 18, and supplies the decoded write data to the preamplifier 14. The DDC 18, including a sequencer for implementing an operation according to a microprogram downloaded from a microcontroller 24, writes data received from a host computer on the disk 10 via the read/write channel circuit 16 and the preamplifier 14, or reads data from the disk 10 via the preamplifier 14 and the read/write channel circuit 16 and sends the read data to the host computer. The DDC 18 also interfaces communication between the host computer and the microcontroller 24, and temporarily stores data transmitted between the host computer and the microcontroller 24, and between the host computer and the read/write channel circuit 16. The microcontroller 24 controls the DDC 18 in response to a read or write command received from the host computer, and also controls track seek and track following. A ROM 26 stores operation programs and various designated values of the microcontroller 24. The microcontroller 24 supplies a control value for controlling rotation of the disks 10 to the spindle motor driver 30, to thereby drive the spindle motor driver 30 and rotate the disks 10. A disk signal controller 22 generates various timing signals needed for reading and writing under the control of the microcontroller 24, decodes servo information, and supplies the decoded servo information to the microcontroller 24. An ASIC (Applicaton Specific Integrated Circuit) designed suitably for an HDD is generally used for this disk signal controller 22.

Figure 2A:
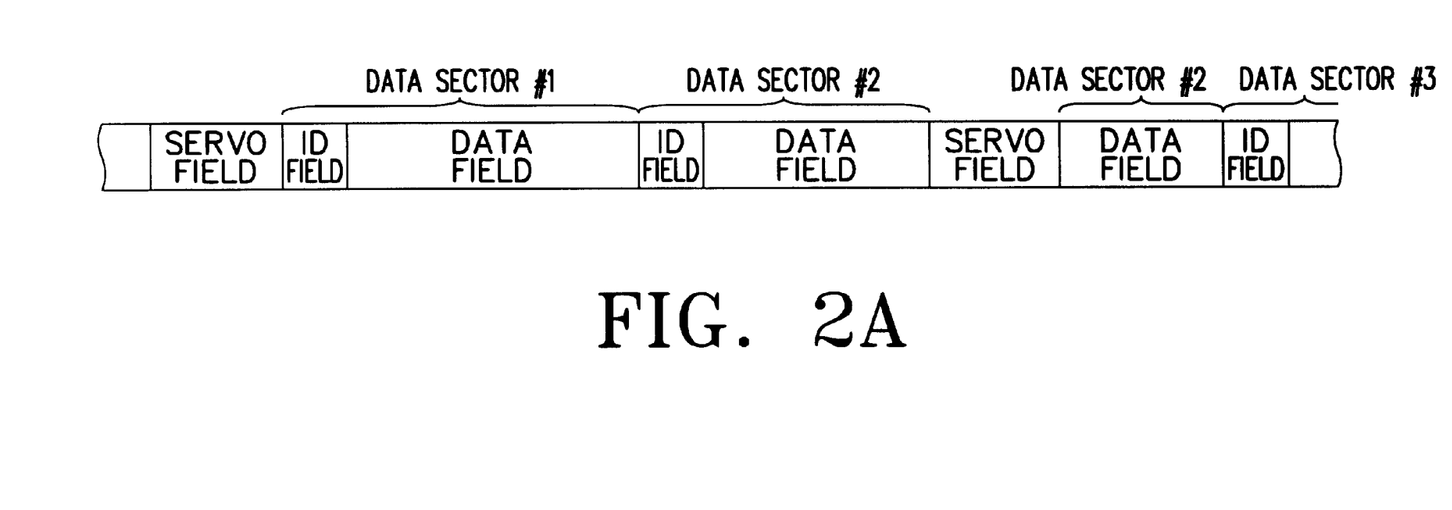
FIG. 2A illustrates a data format for a CDR disk.
Figure 2B:
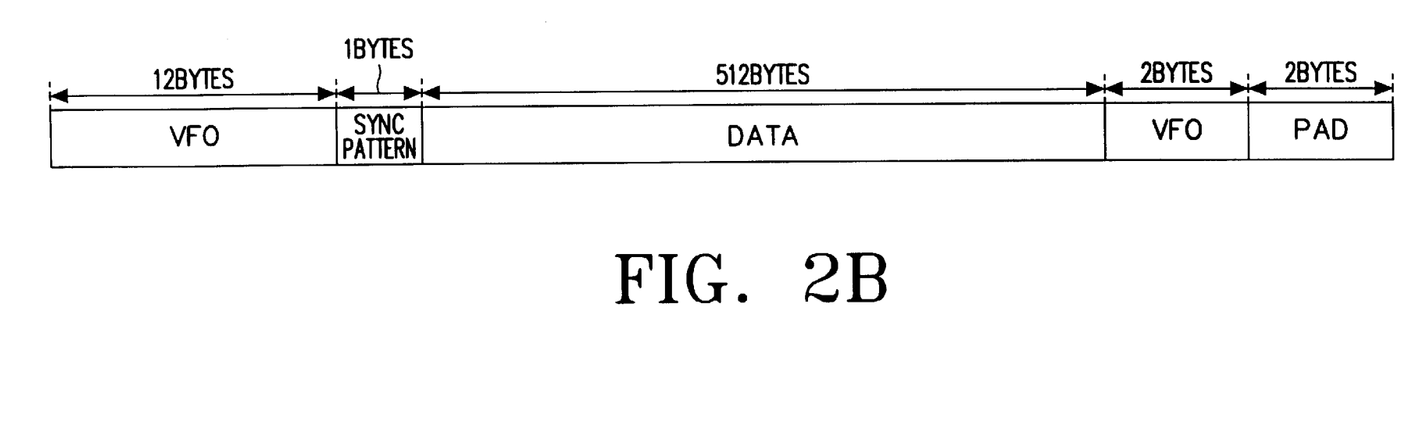
FIG. 2B illustrates a detailed format of the data field shown in FIG. 2A.

An exemplary data format applied to a disk of the above HDD is shown in FIGS. 2A and 2B. FIG. 2A illustrates a data format for a CDR (Constant Density Recording) disk, not on an accurate scale. In the CDR data format, a complete data sector and a split data sector are disposed between servo fields in a track. The CDR is also called ZBR (Zone-Bit Recording).

Generally, an information recording area of a CDR disk is split into a plurality of zones having uniform recording densities and disposed, radially from the center of the disk. The tracks in each split zone have different data sectors. That is, a track located in an outer circumferential zone has more data sectors than that in an inner circumferential zone. A data sector is a unit area for accessing data on a disk by a magnetic disk recording device, and has the same size, for example, 512 bytes, regardless of positions on the disk. In an embedded sector servo, which is one of the schemes for providing head position information to the magnetic disk recording device, one data sector can be split into two segments depending on zones on the disk and, servo information areas and data areas are alternately arranged along the circumferential direction in each track. A servo information area is a servo field for recording servo information, and a data area is used for recording actual data and provides a data sector.

In FIG. 2A, each data sector is divided into an ID (Identification) field and a data field. Header information for identifying a corresponding data sector is recorded in the ID field, and actual digital data is recorded in the data field following the ID field.

The data field is constituted as shown in FIG. 2B. FIG. 2B illustrates a detailed format of the data field. Referring to FIG. 2B, the data field is composed of VFO (Variable Frequency Oscillator) which is a data preamble, a sync pattern which is a data address mark, actual data, ECC (Error Correction code), and PAD which is a data postamble. The data preamble VFO occupies 12 bytes between a postamble of the ID field and the sync pattern, and is a synchronization signal for clock synchronization when reading the data field. The sync pattern provides synchronization necessary for reading the data with the magnetic disk recording device by notifying of the start of the data. The data is digital data actually stored on the disk. The ECC is an error detection code for detecting and correcting errors in the data address mark and the data. The postamble PAD provides a timing margin needed after reading the data.

To briefly describe a read operation of data from this data field of the HDD shown in FIG. 1, when sector pulses are generated in a sector pulse generating circuit of the HDD, a sequences of the DDC 18 senses the sector pulses, detects the starting position of a data sector, and sets a read gate (RG) signal to a high level. Thus, the data field starts to be read.

Figure 3:
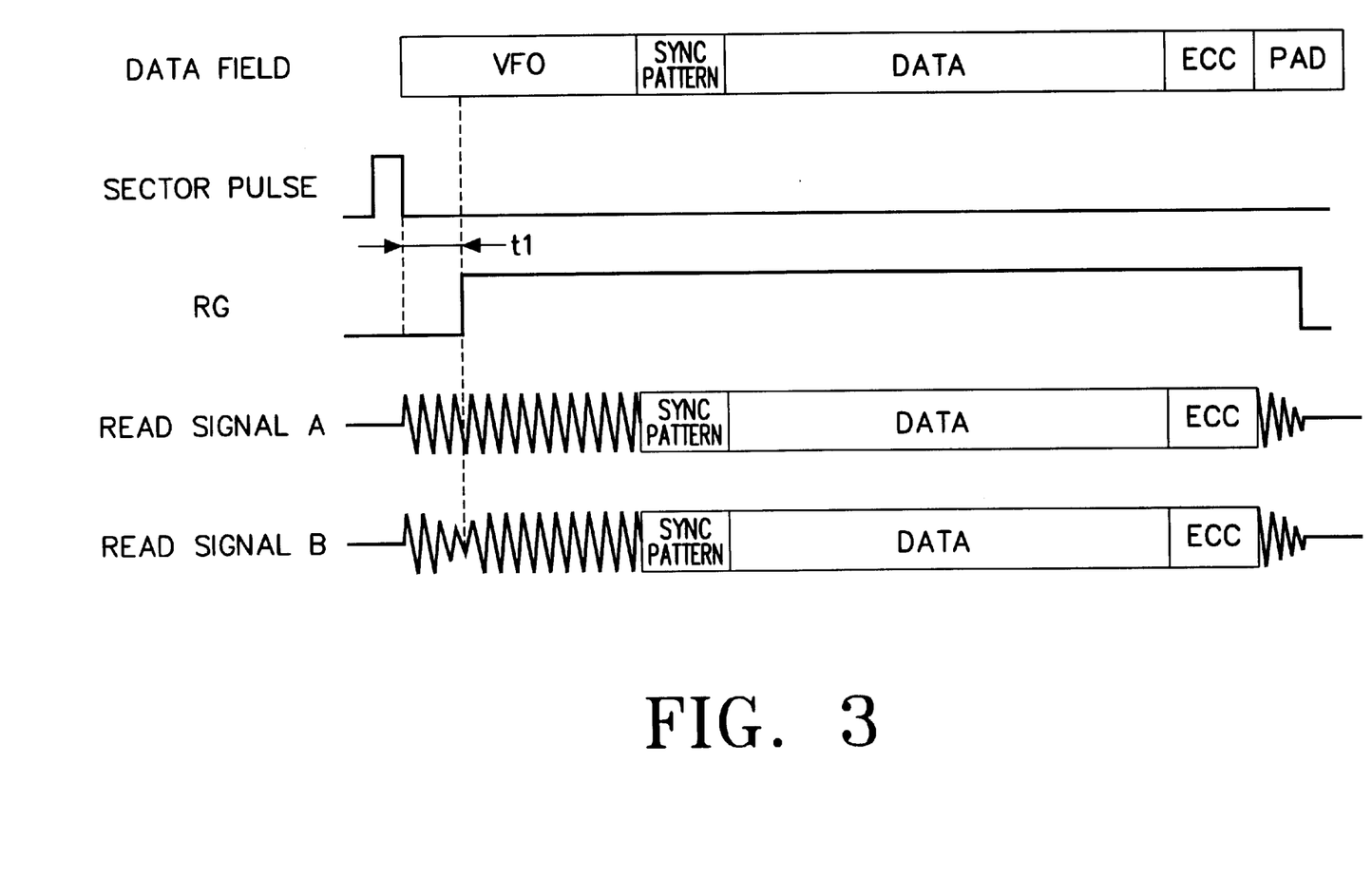
FIG. 3 is a view describing a problem encountered in reading a data field in an earlier arrangement.

However, the above read operation has the following problem. FIG. 3 is a view referred to for describing the problem encountered in the data field reading operation of earlier arrangements. Referring to FIG. 3, the RG signal is generated a predetermined time, that is, a time t1 determined according to a microprogram, after the sector pulses are generated. Then, an AGC (Automatic Gain Control) level and the phase of a PLL (Phase Locked Loop) circuit are simultaneously adjusted according to a detected VFO signal. The AGC and PLL are completely adjusted by the time the sync pattern is detected. An AGC circuit, provided in the read/write channel circuit 16, automatically controls the gain of a signal preamplified in the preamplifier 14, amplifies the gain-controlled signal, and outputs the amplified signal. As shown in FIG. 3, there is no problem when the VFO signal is normal in amplitude and waveform shape as in a read signal A. On the other hand, the VFO signal may be defective at a rising edge of an RG signal as in a read signal B, or the VFO signal may be inaccurately written due to jitter of a spindle motor during writing. With defects in the VFO signal, the AGC level and the PLL phase are unstably adjusted.

Figure 4:
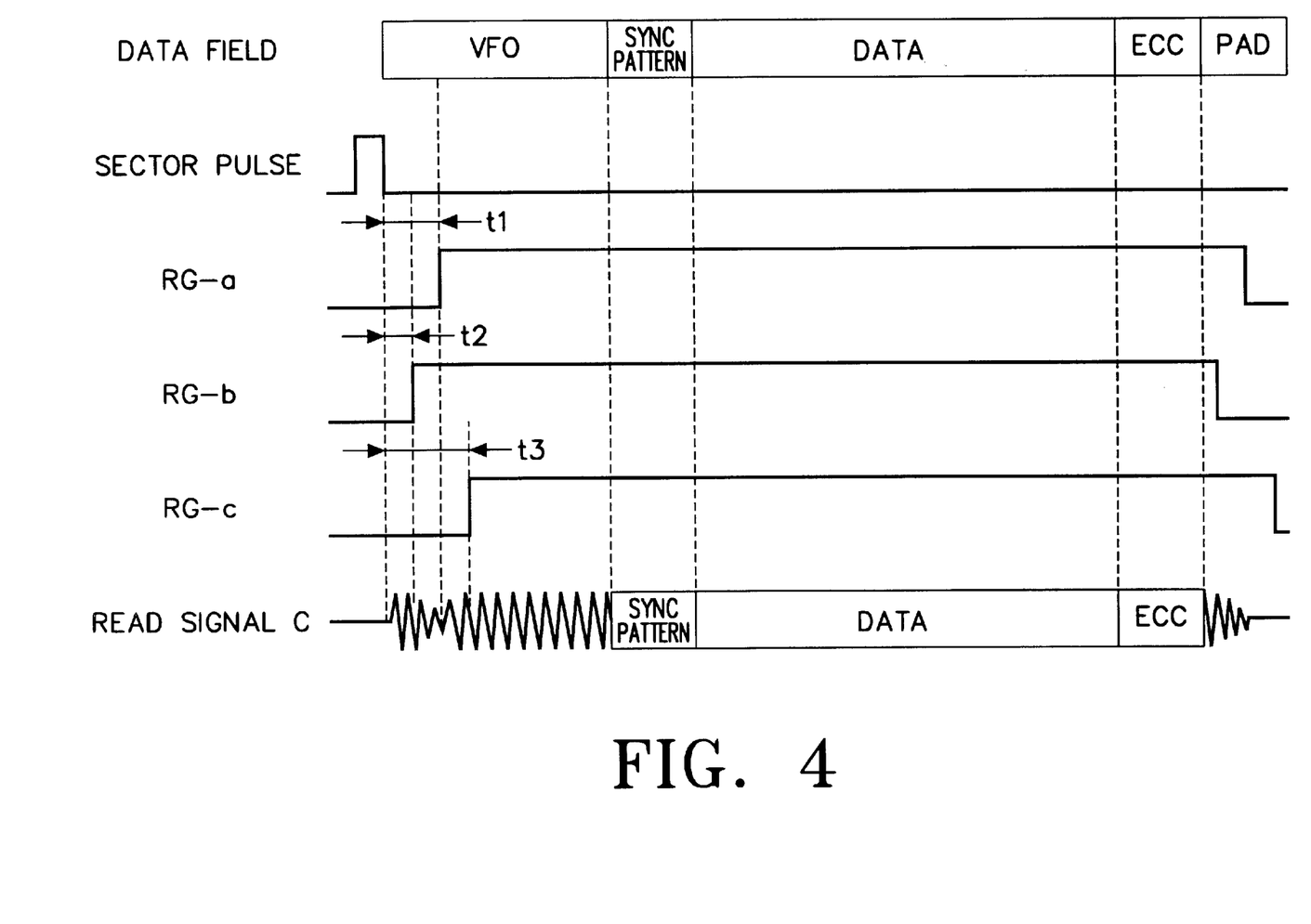
FIG. 4 is a view describing a data field according to an embodiment of the present invention.

FIG. 4 is a view referred to for describing a data field according to an embodiment of the present invention. When a sector pulse generating circuit in an HDD generates sector pulses, a sequence of the DDC 18 senses the sector pulses, detects the starting position of a data sector, and sets an RG signal to a high level a predetermined time later. Thus, the data field starts to be read. Here, the phase of a PLL circuit is adjusted while determining an AGC level depending on a detected VFO signal. The AGC and PLL are completely adjusted by the time a sync pattern is detected, and then the data and the ECC are read.

Here, as shown in FIG. 4, if the VFO signal of a read signal C has a defect at a time t1 when a predetermined RG-a signal becomes high and a read error is generated, an RG high signal generating timing is adjusted to be earlier. A time t2 taken for an RG-b signal to be high after generation of the sector pulses is shorter than the time t1 for setting the RG-a signal to a high level in a normal state. At a rising edge of the RG-b signal, the VFO signal is relatively normal in amplitude and cycle. Thus, the AGC level and the PLL phase are easily adjusted.

As shown in FIG. 4, if a read error is generated due to a defect of the VFO signal of a read signal C in the time period t1 when the RG-a signal becomes high, the RG high signal generating timing can be delayed in the present invention. A time t3 required for setting an RG-c signal to a high level after generation of the sector pulses is longer than the RG-a high signal generating time t1 in a normal state. Because the VFO signal is relatively normal in amplitude and cycle at the rising edge of the RG-c signal, the AGC level and the PLL phase are easily adjusted.

Figure 5:
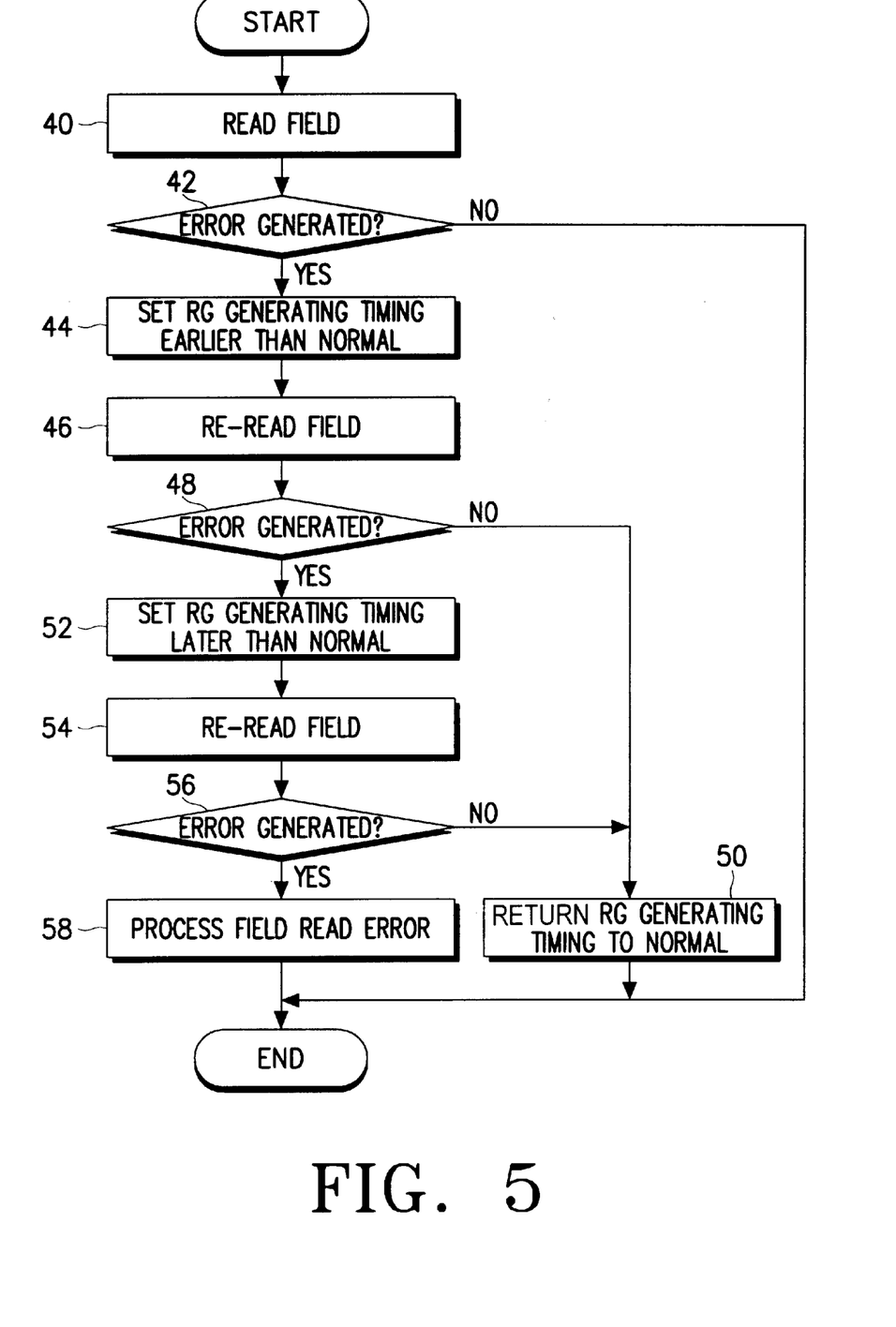
FIG. 5 is a flowchart of a process implemented by a microcontroller to read a data field according to the embodiment of the present invention.

A read operation of a data field according to the present invention will be described. FIG. 5 is a flowchart for controlling a data field read operation by the microcontroller 24 according to an embodiment of the present invention. Referring to FIG. 5, the microcontroller 24 implements a field read operation, in step 40. If an error is generated during the field read operation in step 42, the procedure goes to step 44. Otherwise, the procedure ends. In step 44, the microcontroller 24 adjusts an RG high signal generating timing to be earlier by a predetermined time. Then, in step 46, the field read operation is implemented on the basis of the RG high signal generating timing adjusted in step 44. In step 48, it is determined whether a field read error is generated. If no field read error is generated, the RG high signal generating timing is returned to a normal state, in step 50. If a field read error is generated, the RG high signal generating timing is set a predetermined time after a normal RG high signal generating timing, in step 52. In step 54, the field read operation is implemented on the basis of the RG high signal generating timing adjusted in step 52. In step 56, it is determined whether a field read error is generated. If there is no error, the RG high signal generating timing is returned to the normal state in step 50 and the procedure ends. If a field read error is generated, the procedure goes to step 58 in which a field read error process is performed, and then the procedure ends.

As described above, the present invention reliably adjusts an AGC level and a PLL, phase even with a defect in a VFO signal, because an RG signal generating timing of a sequencer in a DDC is adjusted according to a microprogram of a microcontroller during a field read operation.

While an RG high signal generating timing is adjusted twice to be earlier and later by a predetermined time for a field read operation in the above specific embodiment of the present invention, the field read operation can be repeatedly performed by adjusting the RG high signal generating timing in several split time periods.

In addition, although the embodiment of the present invention has been described in application to a data field, it can be extended to a servo field or an ID field.

What is claimed is:

1. A method of reading an information recording field on an information recording disk of a hard disk drive, comprising the steps of:
   determining whether a read error has been generated during a reading of the information recording field;
   adjusting a read gate signal generating timing to be different from a normal timing when it is determined that the read error has been generated; and
   re-reading the information recording field using the adjusted read gate signal generating timing.

2. The method as claimed in claim 1, wherein the read gate signal generating timing is adjusted to be earlier than normal by a predetermined time period.

3. The method as claimed in claim 1, wherein the read gate signal generating timing is adjusted to be later than normal by a predetermined time period.

4. An apparatus for reading an information recording field on an information recording disk of a hard disk drive, comprising:
   means for reading the information recording field;
   means for determining whether a read error has been generated during the reading of the information recording field by said reading means; and
   means for adjusting a read gate signal generating timing to be different from a normal timing when said determining means determines that the read error has been generated;
   said reading means re-reading the information recording field using the adjusted read gate signal generating timing.

5. The apparatus as claimed in claim 4, wherein said adjusting means adjusts the read gate signal generating timing to be earlier than normal by a predetermined time period.

6. The apparatus as claimed in claim 4, wherein said adjusting means adjusts the read gate signal generating timing to be later than normal by a predetermined time period.

7. A method of reading an information recording field on an information recording disk of a hard disk drive, comprising the steps of:

reading the information recording field;

determining whether a read error has been generated during the reading of the information recording field;

upon a determination that a read error has been generated, setting a read gate signal generating timing to be earlier than normal by a predetermined time period;

re-reading the information recording field;

determining whether a read error has been generated during the re-reading of the information recording field;

upon a determination that a read error has been generated during the re-reading of the information recording field, setting a read gate signal generating timing to be later than normal by a predetermined time period;

re-reading the information recording field a second time;

determining whether a read error has been generated during the re-reading of the information recording field the second time; and upon a determination that a read error has been generated during the re-reading of the information recording field the second time, processing a field read error.

8. An apparatus for reading an information recording field on an information recording disk of a hard disk drive, comprising:

reading means for reading the information recording field;

determining means for determining whether a read error has been generated during the reading of the information recording field; and setting means for setting a read gate signal generating timing to be earlier than normal by a predetermined time period upon a determination by the determining means that a read error has been generated;

said reading means re-reading the information recording field;

said setting means setting a read gate signal generating timing to be later than normal by a predetermined time period upon a determination by said determining means that a read error has been generated during the re-reading of the information recording field;

said reading means re-reading the information recording field a second time; and wherein said apparatus further comprises processing means for processing a field read error upon a determination by said determining means that a read error has been generated during the re-reading of the information recording field the second time.

* * * * *